United States Patent
Liu et al.

(10) Patent No.: US 12,387,441 B2
(45) Date of Patent: Aug. 12, 2025

(54) IMMERSIVE EXHIBITION IMAGE ARRANGEMENT SYSTEM AND IMMERSIVE EXHIBITION IMAGE ARRANGEMENT PREVIEW METHOD

(71) Applicant: PSJ INTERNATIONAL LTD., Tortola (VG)

(72) Inventors: Yu-Shu Liu, New Taipei (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 188 days.

(21) Appl. No.: 18/352,219

(22) Filed: Jul. 13, 2023

(65) Prior Publication Data

US 2024/0312148 A1  Sep. 19, 2024

(30) Foreign Application Priority Data

Mar. 13, 2023  (TW) .................................. 112109073

(51) Int. Cl.
*G06T 19/00*  (2011.01)
*G02B 27/01*  (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ..... G06T 19/006; G06T 17/00; G06T 19/003; G06T 2210/04; G06T 2219/2004;
(Continued)

(56) References Cited

U.S. PATENT DOCUMENTS

| | | |
|---|---|---|
| 2019/0005717 A1 | 1/2019 | Singh et al. |
| 2023/0177594 A1* | 6/2023 | Besecker ............... G06T 19/20 705/27.2 |
| 2024/0094861 A1* | 3/2024 | Chou ..................... G06T 19/20 |

FOREIGN PATENT DOCUMENTS

| | | |
|---|---|---|
| CN | 109416842 A | 3/2019 |
| CN | 111448544 A | 7/2020 |

(Continued)

OTHER PUBLICATIONS

Volker Kuchelmeister, "The Virtual (Reality) Museum of Immersive Experiences", http://dx.doi.org/10.14236/ewic/EVA2018.39.

*Primary Examiner* — Chong Wu
(74) *Attorney, Agent, or Firm* — Li & Cai Intellectual Property Office

(57) ABSTRACT

An immersive exhibition image arrangement system and an immersive exhibition image arrangement preview method are provided. The immersive exhibition image arrangement system includes an arrangement interface that includes image playback regions, image upload options, a 3D model upload option, an audio upload option, and a conversion option. Each of the image playback regions corresponds to an image playback surface of an immersive exhibition venue. Images to be played and a virtual 3D model file corresponding to the immersive exhibition venue can be uploaded by selecting the image upload options and the 3D model upload option. When the conversion option is selected, each of the images to be played corresponding to one of the image playback regions is integrated into a corresponding one of virtual image playback surfaces of the virtual 3D model file to form an integrated virtual 3D model file that is converted into a VR file.

10 Claims, 6 Drawing Sheets

(51) Int. Cl.
*G06F 3/01* (2006.01)
*G06F 3/04855* (2022.01)
*G06T 17/00* (2006.01)

(52) U.S. Cl.
CPC .......... *G06F 3/04855* (2013.01); *G06T 17/00* (2013.01); *G06T 19/003* (2013.01)

(58) Field of Classification Search
CPC ....... G06T 19/20; G02B 27/017; G06F 3/011; G06F 3/04855; G06F 3/04815; H04N 21/41415; H04N 21/816
See application file for complete search history.

(56) References Cited

FOREIGN PATENT DOCUMENTS

| EP | 3470974 A1 | 4/2019 |
| TW | 202109244 A | 3/2021 |
| WO | WO2017192467 A1 | 11/2017 |
| WO | WO2021003376 A1 | 1/2021 |

\* cited by examiner

IMMERSIVE EXHIBITION IMAGE ARRANGEMENT SYSTEM AND IMMERSIVE EXHIBITION IMAGE ARRANGEMENT PREVIEW METHOD

CROSS-REFERENCE TO RELATED PATENT APPLICATION

This application claims the benefit of priority to Taiwan Patent Application No. 112109073, filed on Mar. 13, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an image arrangement system and an image arrangement preview method, and more particularly to an immersive exhibition image arrangement system and an immersive exhibition image arrangement preview method.

BACKGROUND OF THE DISCLOSURE

In existing immersive exhibition venues, such as an immersive exhibition hall in a commercial building, multiple projectors are used to project images (such as videos, pictures, and animations) onto walls and floors of the immersive exhibition venue at a same time. In this way, visitors of the immersive exhibition venue can experience the immersion provided by the projected images, thereby having an immersive viewing experience.

For a curator arranging the images to be played in the immersive exhibition venue, the immersive exhibition venue needs to be rented outside of the exhibition period in order to configure pre-arranged images in the immersive exhibition venue in advance, so as to ensure that the pre-arranged images can be presented with the expected effect in the immersive exhibition venue. The cost of renting the immersive exhibition venue and the cost of electricity during the rental period can be expensive. Furthermore, if the curator finds that effects of the pre-arranged images to be played in the immersive exhibition venue do not meet expectations, the curator must immediately make changes to the images in order to complete the changes within the rental period; otherwise, the curator will need to rent the immersive exhibition venue for additional periods of time to ensure that the effects of the pre-arranged images to be presented in the immersive exhibition venue meet with expectations.

In addition, when the curator rents the immersive exhibition venue for additional periods of time to preview the pre-arranged images, a significant amount of time is required for transferring the pre-arranged images into a projection system adopted in the immersive exhibition venue, a process that can incur high fees for the curator.

SUMMARY OF THE DISCLOSURE

In response to the above-referenced technical inadequacies, the present disclosure provides an immersive exhibition image arrangement system and an immersive exhibition image arrangement preview method to improve on the issue of a curator having to pay large expenses to rent an immersive exhibition venue outside of the exhibition period to preview an effect of the pre-arranged images played in the immersive exhibition venue, so that the production costs are difficult to be lowered for the curator.

In one aspect, the present disclosure provides an immersive exhibition image arrangement system. The immersive exhibition image arrangement system includes an arrangement program. The arrangement program is to be executed in a processing device, and the arrangement program includes an arrangement interface. The arrangement interface includes a plurality of image playback regions, a plurality of image upload options, a 3D model upload option, an audio upload option, and a conversion option. The plurality of image playback regions correspond to a plurality of image playback surfaces of an immersive exhibition venue, respectively. Each of the plurality of image upload options is provided for a user to upload at least one image to be played, so that one of the plurality of image playback regions is able to play the at least one image to be played. The at least one image to be played is a picture or a video. The 3D model upload option is provided for the user to upload a virtual 3D model file corresponding to the immersive exhibition venue. The audio upload option is provided for the user to upload at least one audio file. When the conversion option is selected, a conversion process is executed. The conversion process includes steps as follows; an attaching step: integrating the at least one image to be played corresponding to one of the plurality of image playback regions into a corresponding one of a plurality of virtual image playback surfaces of the virtual 3D model file, so as to form an integrated virtual 3D model file; and a VR file generation step: converting the integrated virtual 3D model file and the at least one audio file into a VR file. A VR device that plays the VR file is capable of providing the at least one audio file for the user to hear, and allowing the user to see a virtual immersive exhibition venue corresponding to the immersive exhibition venue in a virtual-reality manner. The VR device plays the at least one image to be played on a corresponding one of the plurality of virtual image playback surfaces of the virtual immersive exhibition venue respectively corresponding to the plurality of image playback surfaces.

In another aspect, the present disclosure provides an immersive exhibition image arrangement preview method. The immersive exhibition image arrangement preview method includes steps as follows: a virtual 3D model file establishing step: establishing the virtual 3D model file corresponding to the immersive exhibition venue by using virtual 3D image establishing software; an arrangement step: uploading the virtual 3D model file established in the virtual 3D model file establishing step by using the 3D model upload option of the arrangement interface of the immersive exhibition image arrangement system of the present disclosure, and generating the VR file by using the immersive exhibition image arrangement system; and a previewing step: previewing the VR file by using the VR device. The immersive exhibition image arrangement system further includes the VR device. After the VR file generation step, the conversion process further includes a transmission step that includes: transmitting the VR file to the VR device; the VR device including a head-mounted display and at least one controller, the head-mounted display being mounted on a head of the user, the at least one controller being configured for operation by the user, such that when the VR device plays the VR file, a viewing perspective in the virtual immersive exhibition venue displayed by the head-mounted display and a position of the user in the virtual immersive exhibition venue are changed.

Therefore, in the immersive exhibition image arrangement system and the immersive exhibition image arrangement preview method provided by the present disclosure, a curator (e.g., a director) of an immersive exhibition can easily and conveniently preview the images arranged beforehand as presented in the immersive exhibition venue without additionally renting the immersive exhibition venue. Therefore, planners for the images of the immersive exhibition can save production cost, and a production time can also be saved for the curator of the immersive exhibition.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
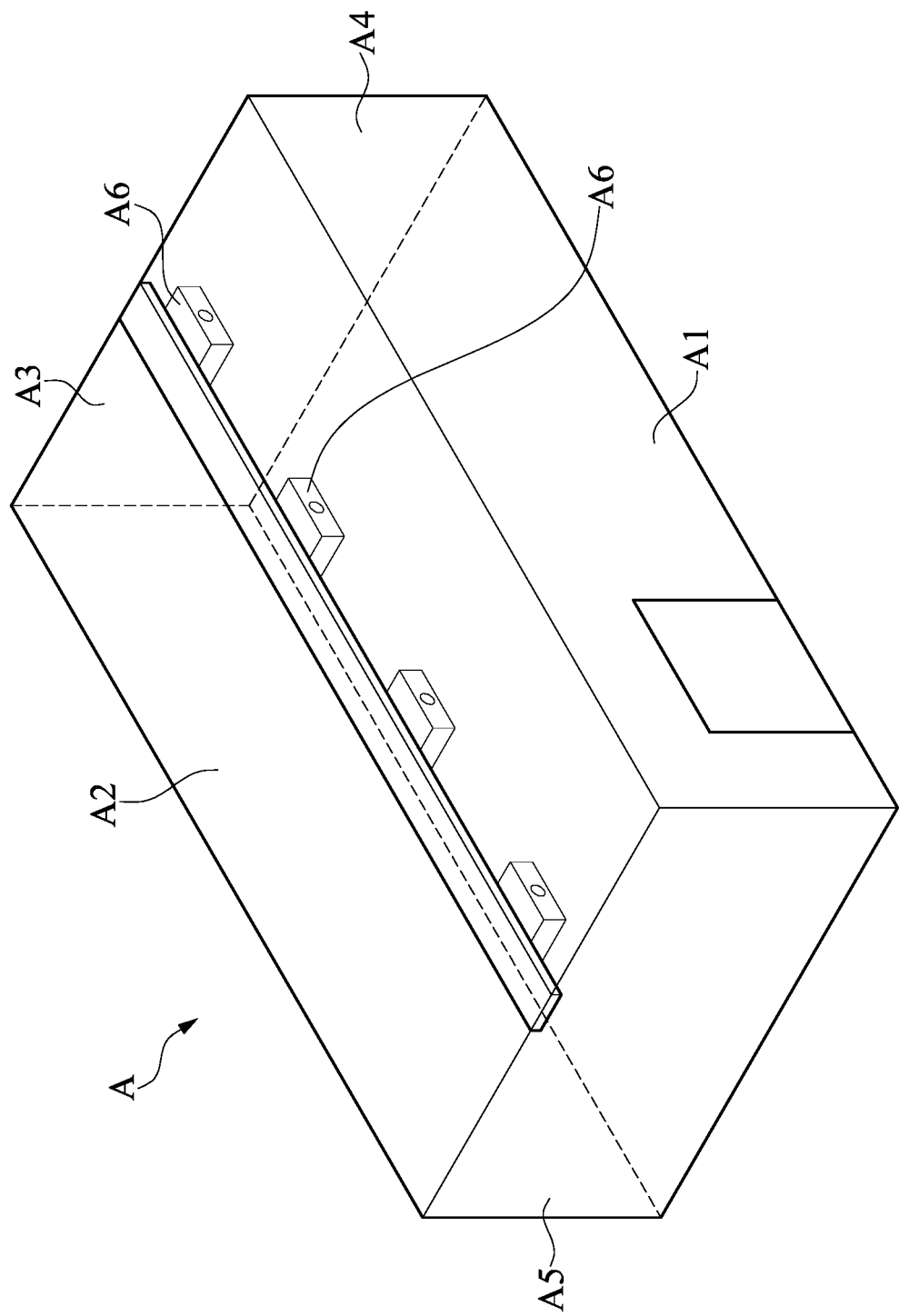
FIG. 1 is a schematic view of an immersive exhibition venue according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
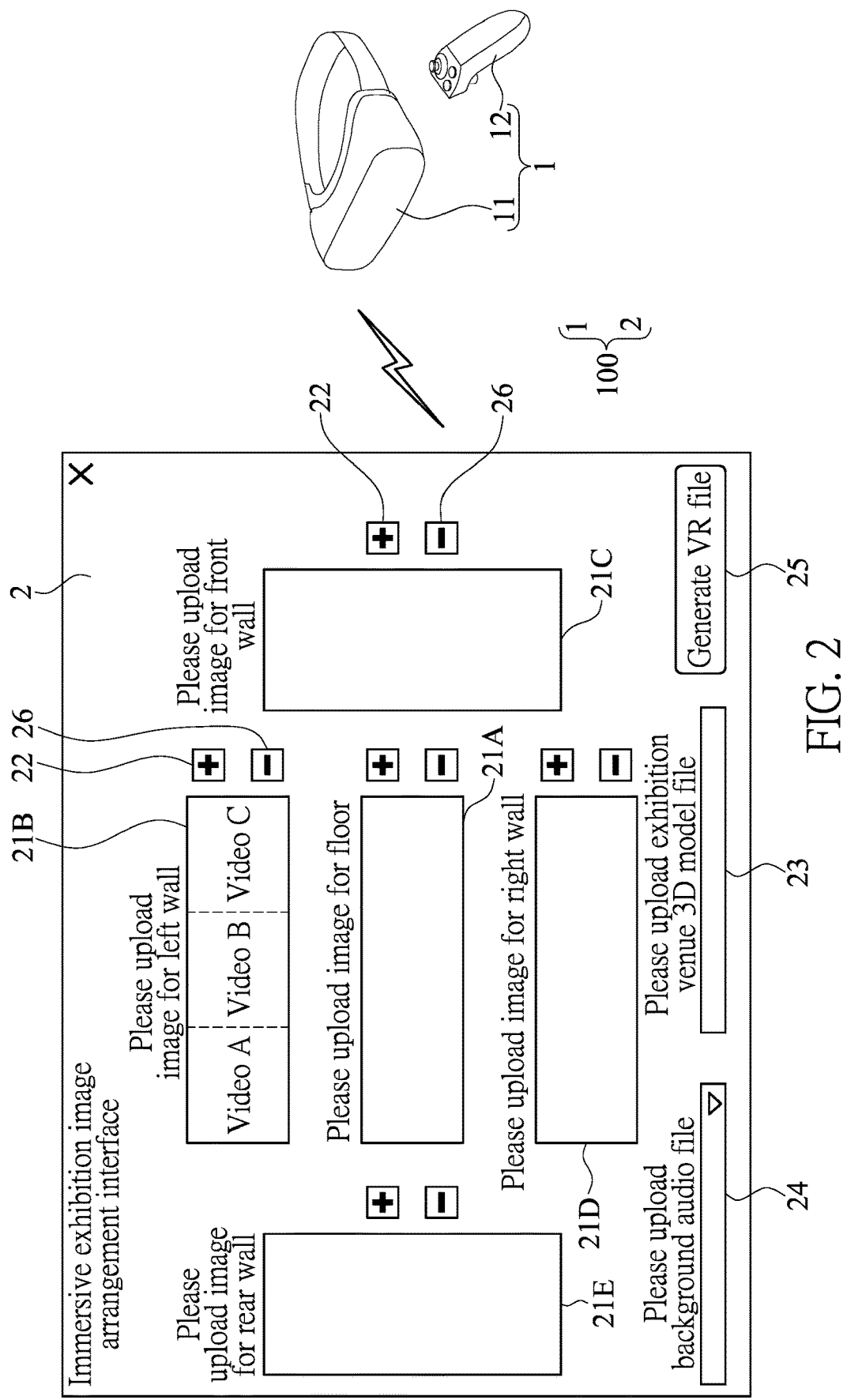
FIG. 2 is a schematic view of an arrangement interface and a VR device of an immersive exhibition image arrangement system according to a first embodiment of the present disclosure.
Figure 3:
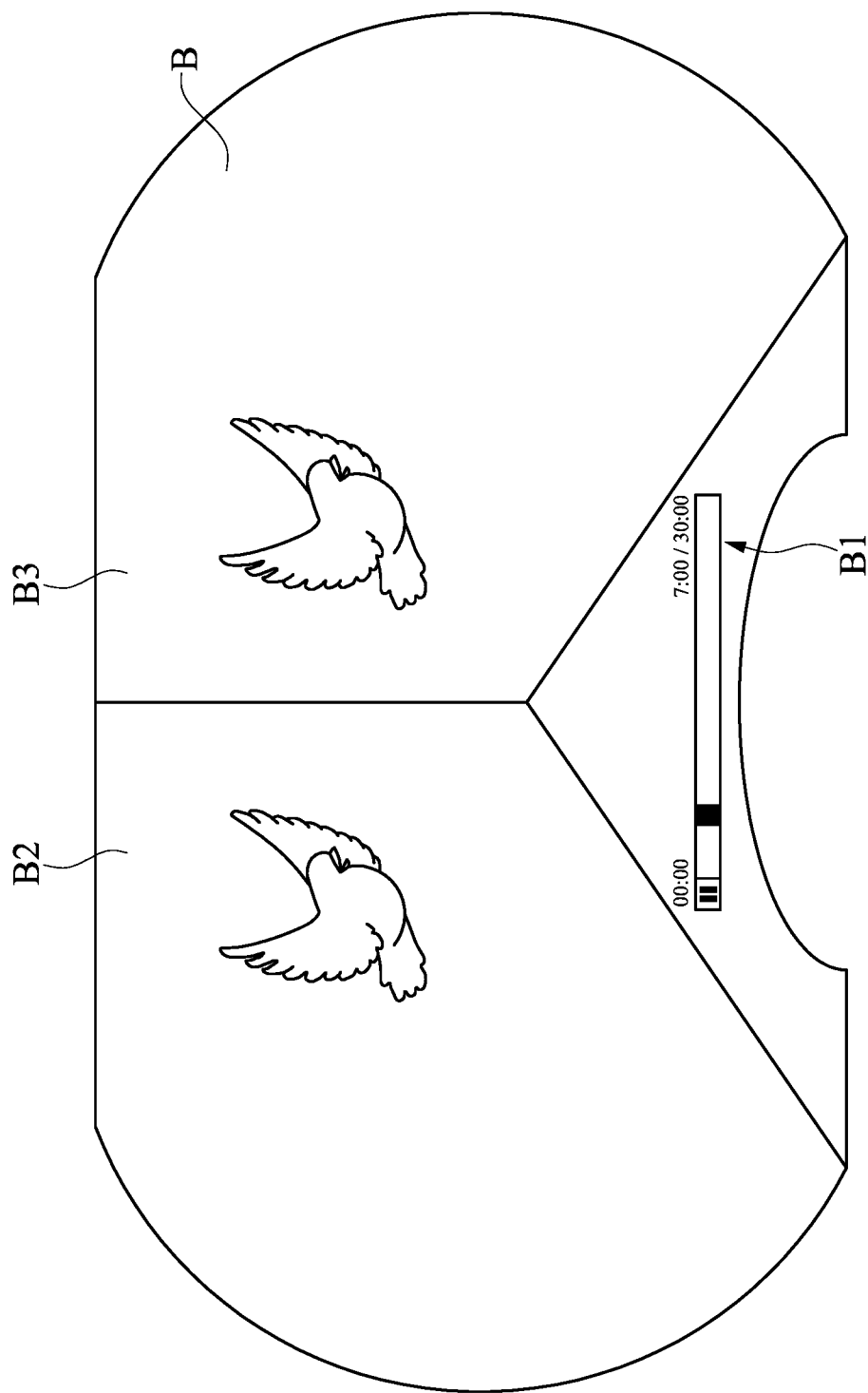
FIG. 3 is a schematic view of viewing a VR file of the immersive exhibition image arrangement system according to the present disclosure by using the VR device.

Referring to FIG. 1 to FIG. 3, FIG. 1 is a schematic view of an immersive exhibition venue according to the present disclosure, FIG. 2 is a schematic view of an arrangement interface and a VR device of an immersive exhibition image arrangement system according to a first embodiment of the present disclosure, and FIG. 3 is a schematic view of viewing a VR file of the immersive exhibition image arrangement system according to the present disclosure by using the VR device.

As shown in FIG. 1, an existing immersive exhibition venue A includes five image playback surfaces and a plurality of projectors A6. The five image playback surfaces are a floor image playback surface A1, a left wall image playback surface A2, a front wall image playback surface A3, a right wall image playback surface A4, and a rear wall image playback surface A5. The plurality of projectors A6 of the immersive exhibition venue A respectively project at least one image on each of the floor image playback surface A1, the left wall image playback surface A2, the front wall image playback surface A3, the right wall image playback surface A4, and the rear wall image playback surface A5. The number of the image playback surfaces included in the immersive exhibition venue A is not limited to five, and in other embodiments, the ceiling of the immersive exhibition venue may also be included as one of the image playback surfaces.

An immersive exhibition image arrangement system 100 of the present disclosure includes an arrangement program and a VR device 1. In other embodiments, the immersive exhibition image arrangement system 100 of the present disclosure may be provided without the VR device 1. The VR device 1 may be one of various existing VR devices 1, such as a SAMSUNG GEAR VR®, a PLAYSTATION VR®, an OCULUS®, a META QUEST®, or an HTC VIVE®.

The arrangement program includes an arrangement interface 2. The arrangement program can be executed in a processing device such as a computer (a desktop computer, a tablet computer, a laptop computer, etc.) or a server, and the arrangement interface 2 can be in the form of an application or a webpage presented on a display connected to the processing device. A manner and content of presentation of the arrangement interface 2 is not limited to that shown in FIG. 2.

The arrangement interface 2 includes five image playback regions, a plurality of image upload options 22, a 3D model upload option 23, an audio upload option 24, and a conversion option 25. Each of the image playback regions corresponds to one of the image playback surfaces in the immersive exhibition venue A. That is, any of the image playback surfaces in the immersive exhibition venue A can correspond to one of the image playback regions of the arrangement interface 2. For example, the five image playback regions of the arrangement interface 2 may be a floor image playback region 21A, a left wall image playback region 21B, a front wall image playback region 21C, a right wall image playback region 21D, and a rear wall image playback region 21E. Each of the image playback regions has an adjacent one of the image upload options 22, and the image upload options 22 allow the user to upload at least one image to be played and then enable one of the image playback regions to play the at least one image to be played. The image to be played can be a static image, a video having audio, or a video without audio. For example, the video can be a video taken by using a camera or a video (such as an animation) created by using a computer.

For example, the arrangement interface 2 contains five image playback regions that are a floor image playback region and four wall image playback regions, and the floor image playback region corresponds to the floor of the immersive exhibition venue A and the four wall image playback regions correspond to the four walls of the immersive exhibition venue A. A curator of the images can upload the images to be played on the floor of the immersive exhibition venue A by clicking on the image upload option 22 located adjacent to the floor image playback region, and can upload the images to be played on one of the walls of the immersive exhibition venue A by clicking on the image upload option 22 located adjacent to any of the four wall image playback regions.

In practical applications, each of the image playback regions corresponds to one of the image upload options 22, and at least one of the image upload options 22 allows the user to upload multiple images to be played, so that multiple images to be played can be played at the same time in a single image playback region. On the other hand, the arrangement interface 2 may also include a plurality of image deletion options 26, the plurality of image playback regions correspond to the plurality of image deletion options 26, respectively, and each of the image deletion options 26 allows the user to delete the at least one of the images to be played in one of the image playback regions.

In other words, if the curator wants to project multiple images to be played at the same time on the floor of the immersive exhibition venue A, the curator can repeatedly operate the image upload option 22 located adjacent to the floor image playback region 21A in the arrangement interface 2 to upload two or more images to be played, and the corresponding two or more images to be played can be displayed in the floor image playback region 21A. On the other hand, if the curator wants to display only one image to be played in the floor image playback region 21A when two images to be played are displayed in the floor image playback region 21A, the curator can delete one of the two images to be played in the floor image playback region 21A by clicking on the image deletion option 26 located adjacent to the floor image playback region 21A.

The 3D model upload option 23 is provided for the user to upload a virtual 3D model file corresponding to the immersive exhibition venue A. The virtual 3D model file can be, for example, a file generated by using relevant 3D modeling software such as Unity 3D. When the virtual 3D model file is opened using the relevant 3D modeling software, the user will be able to see a virtual model proportional to the immersive exhibition venue A, specifically the walls and floors proportional to the image playback surfaces of the immersive exhibition venue A.

The audio upload option 24 is provided for the user to upload at least one audio file. Specifically, if the curator wants to have at least one silent video played on each of the image playback surfaces of the immersive exhibition venue A, and to have a single audio file played in the immersive exhibition venue A, the curator can upload the audio file by operating the audio upload option 24.

When the conversion option 25 is selected, a conversion process is executed, and the conversion process includes the following steps.

An attaching step: integrating the at least one image to be played corresponding to one of the plurality of image playback regions into a corresponding one of a plurality of virtual image playback surfaces of the virtual 3D model file, so as to form an integrated virtual 3D model file.

A VR file generation step: converting the integrated virtual 3D model file and the at least one audio file into a VR file.

The VR device 1 that plays the VR file is capable of providing the at least one audio file for the user to hear, and allowing the user to see a virtual immersive exhibition venue corresponding to the immersive exhibition venue in a virtual-reality manner. The VR device plays the at least one image to be played in a corresponding one of the plurality of virtual image playback surfaces of the virtual immersive exhibition venue respectively corresponding to the plurality of image playback surfaces.

For example, the virtual 3D model file has five virtual image playback surfaces, one of the five virtual image playback surfaces corresponds to the floor of the immersive exhibition venue A, and the other four virtual image playback surfaces correspond to the four walls of the immersive exhibition venue A. In the attaching step, for example, the relevant functions or toolkits that are built-in in the UNITY 3D software and OPENXR software can be used to integrate the images to be played in the floor image playback region and the four wall image playback regions in the arrangement interface 2 into the corresponding five virtual image playback surfaces in the virtual 3D model file by means of attachment, so that each virtual image playback surface in the virtual 3D model file has the corresponding videos to be played uploaded by the user in the arrangement interface 2 embedded therein. In one practical application, relevant functions and methods such as XRInteractionManager, XROrigin, LocomotionSystem in the XRInteraction Toolkit, UnityEngine. Video library, and UnityEngine.Networking library as provided in Unity can be used to integrate the images to be played in the floor image playback region and the four wall image playback regions in the arrangement interface 2 into the corresponding five virtual image playback surfaces in the virtual 3D model file by means of attachment. Therefore, the corresponding images to be played can be played in each of the virtual image playback surfaces in the virtual 3D model file.

In practical applications, in the VR file generation step, for example, relevant functions that are built-in in the UNITY 3D software and OPENXR software can be used to convert the integrated virtual 3D model file and the at least one audio file into the VR file.

In one embodiment, the immersive exhibition image arrangement system 100 includes VR device 1, and after the VR file generation step, there is a transmission step: transmitting the VR files to VR device 1. After the transmission step, the curator can mount a head-mounted display 11 included in the VR device 1 on the head of the curator and hold a controller 12 of VR device 1. When VR device 1 plays the VR file, the curator can see a virtual immersive exhibition venue B in the head-mounted display 11, and the curator can operate the controller 12 to change the viewing perspective in the virtual immersive exhibition venue B displayed by the head-mounted display 11 and a position of the curator in the virtual immersive exhibition venue B, so as to simulate the experience of a viewer in the immersive exhibition venue A.

Referring to FIG. 3, FIG. 3 is a schematic view of viewing a VR file of the immersive exhibition image arrangement system according to the present disclosure by using the VR device. In a preferred embodiment, when the VR file is played by the VR device 1, a time adjustment scroll bar B1 may be further displayed in the virtual immersive exhibition venue B. The controller 12 can be configured for operation of the user, such that the time adjustment scroll bar B1 is capable of being adjusted. By such design, the curator can know more clearly which one of the images to be played needs to be adjusted after viewing the virtual immersive exhibition venue B.

For example, when the curator uses the VR device 1 to watch the immersive exhibition venue A, an image of a bird is predetermined to virtually fly from a left wall B2 to a front wall B3 in the virtual immersive exhibition venue B. However, the image of the bird appears on the front wall B3 before leaving the left wall B2, indicating that the coordination between the two images to be played needs to be adjusted. At this time, the curator can watch the time adjustment scroll bar B1 in the virtual immersive exhibition venue B and know what point in time in the virtual immersive exhibition venue B needs to be re-watched after the two images to be played are adjusted. Therefore, by the design of the virtual immersive exhibition venue B having the time adjustment scroll bar B1, the curators can more conveniently arrange the images to be played.

Accordingly, the immersive exhibition image arrangement system 100 of the present disclosure allows the curator to conveniently and quickly perform previews without having to additionally rent the immersive exhibition venue A, thereby significantly lowering the production cost of an immersive exhibition.

Second Embodiment

Figure 4:
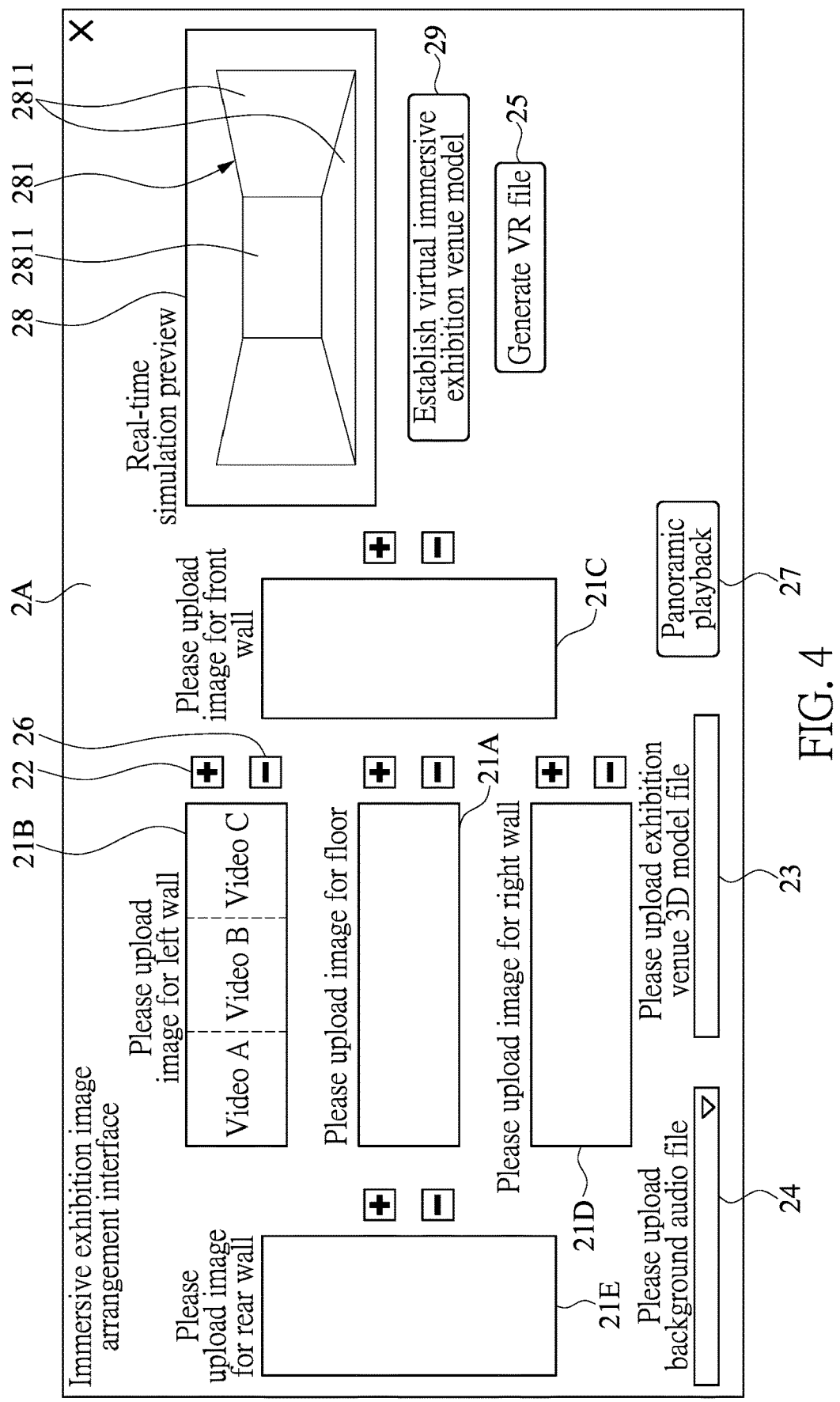
FIG. 4 is a schematic view of the arrangement interface of the immersive exhibition image arrangement system according to a second embodiment of the present disclosure.
Figure 5:
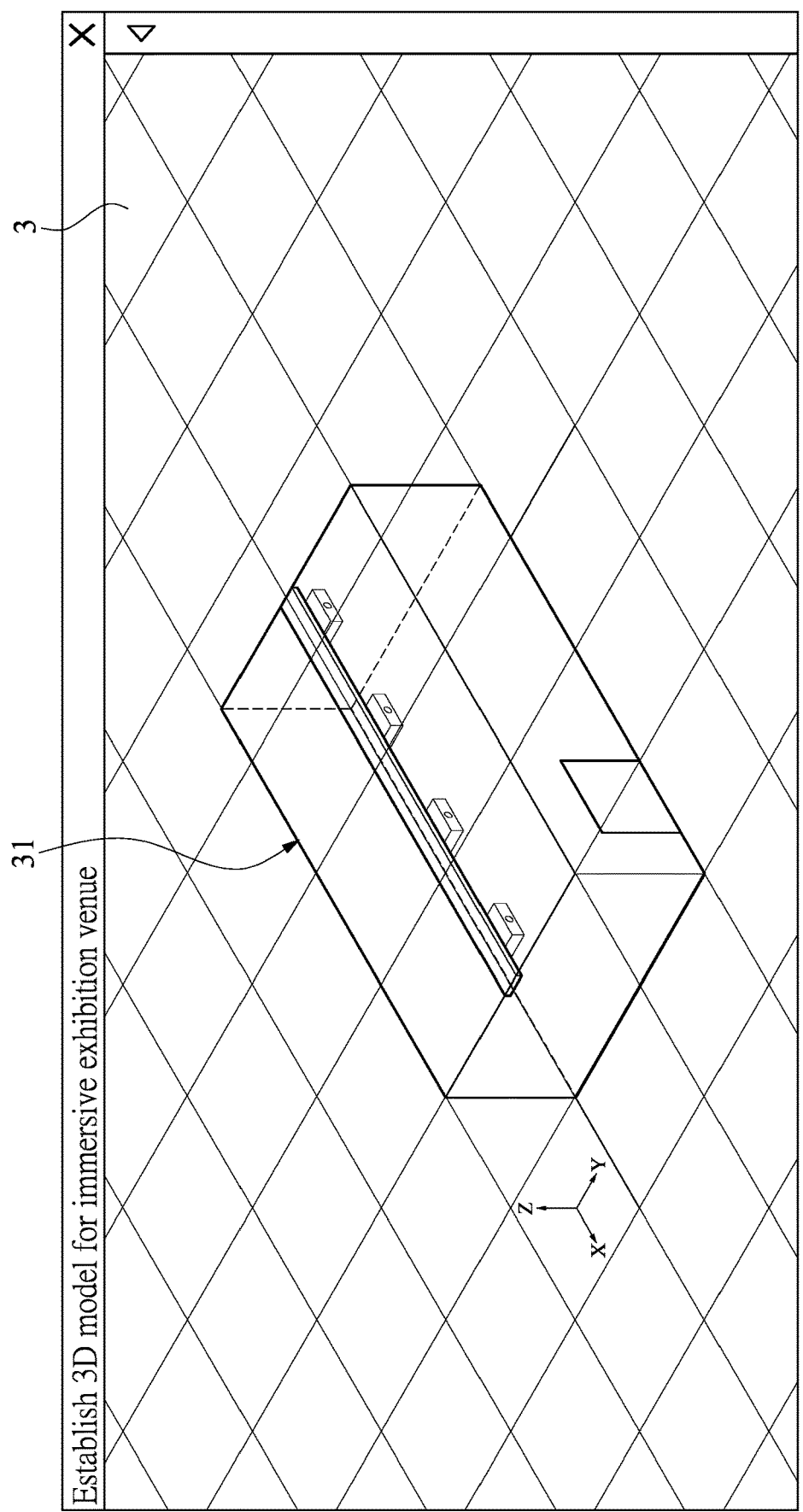
FIG. 5 is a schematic view of the arrangement interface of the immersive exhibition image arrangement system according to the present disclosure.

Referring to FIG. 4 and FIG. 5, FIG. 4 is a schematic view of the arrangement interface of the immersive exhibition image arrangement system according to a second embodiment of the present disclosure, and FIG. 5 is a schematic view of the arrangement interface of the immersive exhibition image arrangement system according to the present disclosure. A first difference between an arrangement interface 2A of this embodiment and the arrangement interface 2 of the previous embodiment is that the arrangement interface 2A further includes a panoramic playback option 27, and the panoramic playback option 27 is able to be selected such that the plurality of image playback regions start to play the at least one image to be played uploaded by the user and the processing device starts to play the at least one audio file.

In other words, after the user uploads all the videos to be played corresponding to each of the image playback regions by using the image upload options 22 of the arrangement interface 2A, the user can allow each of the videos to be played that are uploaded by the user to begin playing in all of the image playback regions by clicking on the panoramic playback option 27, and relevant personnel can directly browse the videos in the arrangement interface 2A. This allows the curator to quickly browse the videos to be played beforehand. In a preferred embodiment, the arrangement interface 2A can further include a time adjustment scroll bar (not shown in the figures), and the curator may adjust the time scroll bar of each of the videos to be played in each image playback region by operating the time adjustment scroll bar of the arrangement interface 2A after clicking on the panoramic playback option 27.

A second difference between the arrangement interface 2A of this embodiment and the arrangement interface 2 of the previous embodiment is that the arrangement interface 2A may further include a real-time preview region 28, and the real-time preview region 28 is able to present a preview 3D model 281 corresponding to the immersive exhibition venue A, and the preview 3D model 281 includes a plurality of preview image playback surfaces 2811 corresponding to the plurality of image playback surfaces, and each of the plurality of preview image playback surfaces 2811 is configured to play the at least one image to be played that is uploaded by the user.

That is, the curator can directly view the plurality of images to be played that are played in the preview 3D model 281 corresponding to the immersive exhibition venue A in the real-time preview region 28 in the arrangement interface 2A. Therefore, the curator can directly view the plurality of images to be played that are played in the immersive exhibition venue A in the real-time preview region 28 in the arrangement interface 2A.

A third difference between the arrangement interface 2A of this embodiment and the arrangement interface 2 of the previous embodiment is that the arrangement interface 2A may further include a model establishing option 29, and the user may select the model establishing option 29 to initiate a model establishing interface 3 (as shown in FIG. 5). The model establishing interface 3 allows the user to establish a virtual 3D model 31 corresponding to the immersive exhibition and to accordingly generate a virtual 3D model file. Furthermore, the model establishing interface 3 allows the user to upload the virtual 3D model file to modify the virtual 3D model file. For example, the user may modify sizes of the walls or floor of the virtual immersive exhibition venue B in the virtual 3D model file. In practical applications, for example, the modeling interface 3 may be developed using Unity 3D software, but the present disclosure is not limited thereto.

In practical applications, the abovementioned three technical features of this embodiment that are different from the previous embodiment are not limited to being co-existent with each other, and any one of the technical features can exist separately from the other two technical features to constitute a new embodiment.

It is worth mentioning that the abovementioned immersive exhibition image arrangement system 100 of the present disclosure can be developed using the UNITY 3D software and the OPENXR software, but it is not limited thereto. In practical applications, the immersive exhibition image arrangement system 100 of the present disclosure can also be developed using other relevant program software that support the construction of VR scenes.

Figure 6:
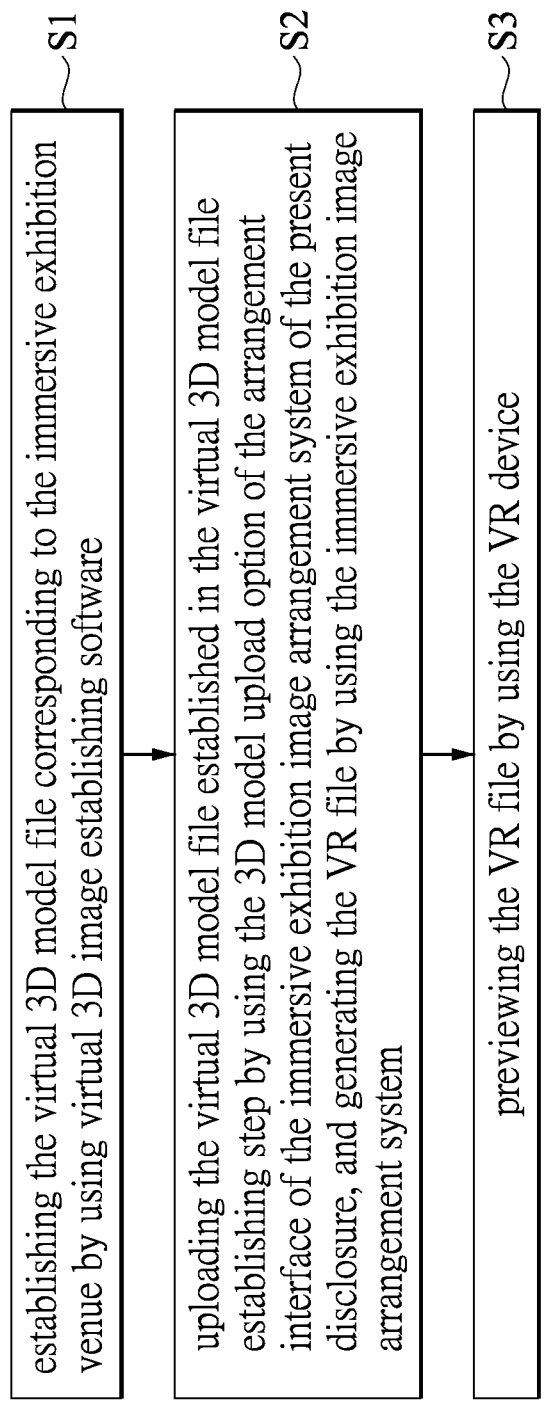
FIG. 6 is a schematic flowchart of an immersive exhibition image arrangement preview method according to the present disclosure.

Referring to FIG. 6, FIG. 6 is a schematic flowchart of an immersive exhibition image arrangement preview method according to the present disclosure. The immersive exhibition image arrangement preview method of the present disclosure includes the following steps.

A virtual 3D model file establishing step S1: establishing the virtual 3D model file corresponding to the immersive exhibition venue by using virtual 3D image establishing software.

An arrangement step S2: uploading the virtual 3D model file established in the virtual 3D model file establishing step by using the 3D model upload option of the arrangement interface of the immersive exhibition image arrangement system of the present disclosure, and generating the VR file by using the immersive exhibition image arrangement system.

A previewing step S3: previewing the VR file by using the VR device.

The immersive exhibition image arrangement system has been described in detail in the arrangement step S2 of the aforementioned embodiments, and will not be reiterated herein.

Beneficial Effects of the Embodiments

In conclusion, in the immersive exhibition image arrangement system and the immersive exhibition image arrangement preview method provided by the present disclosure, a curator can conveniently and easily perform arrangement and preview of images of a immersive exhibition at relatively low cost, and the curator can preview effects of the pre-arranged images as presented in the immersive exhibition venue without needing to rent the immersive exhibition venue for an extra period of time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An immersive exhibition image arrangement system, comprising:
    a VR device; and
    an arrangement interface generated by an arrangement program to be executed in a processing device and presented on a display device connected to the processing device, wherein the an arrangement interface includes:
        a plurality of image playback regions, wherein the plurality of image playback regions correspond to a plurality of image playback surfaces of an immersive exhibition venue, respectively;
        a plurality of image upload options, wherein each of the plurality of image upload options is provided for a user to upload at least one image to be played to the processing device, so that the processing device to enable the display device to play the at least one image to be played in one of the plurality of image playback regions;
        a three-dimensional (3D) model upload option provided for the user to upload a virtual 3D model file corresponding to the immersive exhibition venue to the processing device;
        an audio upload option provided for the user to upload at least one audio file to the processing device; and
        a conversion option, wherein, when the conversion option is selected, a conversion process is executed on the processing device, the conversion process including steps as follows:
            an attaching step: integrating the at least one image to be played corresponding to one of the plurality of image playback regions into a corresponding one of a plurality of virtual image playback surfaces of the virtual 3D model file by the processing device through attachment, so that each virtual image playback surface in the virtual 3D model file has the corresponding videos to be played uploaded embedded therein so as to form an integrated virtual 3D model file; and
            a virtual reality (VR) file generation step: converting the integrated virtual 3D model file and the at least one audio file into a VR file by the processing device;
        wherein the VR device that plays the VR file is configured to provide the at least one audio file for the user to hear, and allowing the user to see a virtual immersive exhibition venue corresponding to the immersive exhibition venue in a virtual-reality manner, and wherein the VR device plays the at least one image to be played in a corresponding one of walls or floor of the virtual immersive exhibition venue respectively corresponding to the plurality of image playback surfaces.

2. The immersive exhibition image arrangement system according to claim 1, wherein, after the VR file generation step, the conversion process further includes a transmission step that includes: transmitting the VR file to the VR device by the processing device, wherein the VR device includes a head-mounted display and at least one controller, wherein the head-mounted display is mounted on a head of the user, the at least one controller is configured for operation by the user, such that when the VR device plays the VR file, a viewing perspective in the virtual immersive exhibition venue displayed by the head-mounted display and a position of the user in the virtual immersive exhibition venue are changed.

3. The immersive exhibition image arrangement system according to claim 2, wherein, when the VR device plays the VR file, a time adjustment scroll bar is further displayed in the virtual immersive exhibition venue, and the controller is configured for operation by the user, such that the time adjustment scroll bar is capable of being adjusted.

4. An immersive exhibition image arrangement preview method, comprising:
    a virtual 3D model file establishing step: establishing the virtual 3D model file corresponding to the immersive exhibition venue by using virtual 3D image establishing software;
    an arrangement step: uploading the virtual 3D model file established in the virtual 3D model file establishing step by using the 3D model upload option of the arrangement interface of the immersive exhibition image arrangement system as claimed in claim 2, and generating the VR file by using the immersive exhibition image arrangement system; and
    a previewing step: previewing the VR file by using the VR device.

5. The immersive exhibition image arrangement system according to claim 1, wherein the arrangement interface further includes a panoramic playback option, and the panoramic playback option is able to be selected such that the processing device start to play the at least one image to be played uploaded by the user in the plurality of image playback regions, and the processing device starts to play the at least one audio file.

6. The immersive exhibition image arrangement system according to claim 1, wherein the arrangement interface further includes a real-time preview region that is able to present a preview 3D model corresponding to the immersive exhibition venue, the preview 3D model includes a plurality of preview image playback surfaces corresponding to the plurality of image playback surfaces, and the processing device is configured to play the at least one image to be played that is uploaded by the user in each of the plurality of preview image playback surfaces.

7. The immersive exhibition image arrangement system according to claim 1, wherein the plurality of image playback regions correspond to the plurality of image upload options, respectively, and at least one of the image upload options is provided for the user to upload multiple ones of the at least one image to be played to the computer device, such that a plurality ones of the at least one image to be played are played on the processing device in one of the image playback regions.

8. The immersive exhibition image arrangement system according to claim 7, wherein the arrangement interface further includes a plurality of image deletion options, and the plurality of image playback regions correspond to the plurality of image deletion options, respectively, and each of the image deletion options allows the user to delete the at least one image to be played in one of the image playback regions through the processing device.

9. The immersive exhibition image arrangement system according to claim 1, further comprising a model establishing interface provided for the user to establish the virtual 3D model file through the processing device.

10. The immersive exhibition image arrangement system according to claim 1, further comprising a model establishing interface provided for the user to upload the virtual 3D model file to the processing device and modify the virtual 3D model file through the processing device, wherein the arrangement interface further includes a model establishing option provided for the user to select, so that the processing device is configured to initiate the model establishing interface.

* * * * *